United States Patent Office 3,420,795
Patented Jan. 7, 1969

3,420,795
POLYAMIDES AND POLYIMIDES FROM DIAMINES CONTAINING ALKOXY PHENOL GROUPS
Rudolph J. Angelo, Wilmington, Del., assignor to E. I. du Pont de Nemours and Company, Wilmington, Del., a corporation of Delaware
No Drawing. Filed Sept. 1, 1964, Ser. No. 393,734
U.S. Cl. 260—47                 20 Claims
Int. Cl. C08g 20/00

ABSTRACT OF THE DISCLOSURE

Polyamide-acids, polyamide-amides, polyamide-esters and polyimides based on diamines having three phenyl rings two of which have 2 alkoxy substituents, their preparation and shaped articles thereof, useful in lacquers, and in film and fiber applications.

---

This invention relates to polymeric polyimides and more particularly is directed to a novel class of polyimides and useful intermediate polyamide-acids, polyamide-amides and polyamide-esters therefor.

The polyimides of this invention have the advantage of outstanding solubility in many organic solvents. This renders them particularly useful in the preparation of lacquers and in film and fiber manufacture where the intractability and insolubility of most polyimides in such solvents causes a serious problem.

The polyimides of the present invention furthermore display outstanding physical and chemical properties which make them very useful as shaped structures such as films, fibers, filaments, foams, powders and the like. The structures are characterized by high tensile properties, desirable electric properties and surprising stability to heat and water.

One important aspect of this invention is that the polyamide-acid intermediates can be converted in solution to polyimides in solution. Furthermore, the final polyimides can be redissolved in ordinary polyamide-type solvents. This means that they are far more useful than ordinary polyimides in the preparation of lacquers and also in applications where it is desirable to be able to remove part of the polyimide. They also are somewhat melt-formable and coalescible and have some adherence when melt-pressed between films of other polyimides.

The novel group of polyimides of this invention is characterized by a recurring unit having the following structural formula:

(1) 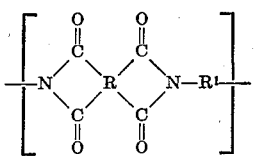

where R is an organic tetravalent radical containing at least 2 carbon atoms; no more than 2 carbonyl groups of each such unit being attached to any one carbon atom of said tetravalent radical, and where $R^1$ is a divalent benzenoid radical of the formula:

(2) 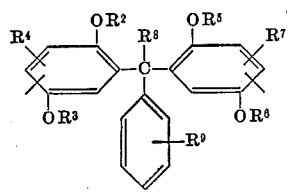

where $R^2$, $R^3$, $R^5$ and $R^6$ can be the same or different and each is alkyl of 1 through 4 carbon atoms and $R^4$, $R^7$, $R^8$ and $R^9$ can be the same or different and each is hydrogen or alkyl of 1 through 4 carbon atoms.

In the above Formula 1, R can be aromatic, aliphatic, cycloaliphatic, heterocyclic, combination of aromatic and aliphatic, or substituted groups thereof. Preferably, R is a tetravalent aromatic radical containing at least one ring of six carbon atoms, said ring characterized by benzenoid unsaturation, the four carbonyl groups being attached directly to separate carbon atoms in a ring and each pair of carbonyl groups being attached to adjacent (ortho or peri) carbon atoms in the R radical. Illustrative of suitable R groups are the following:

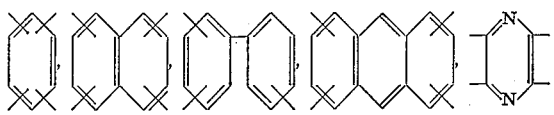

and

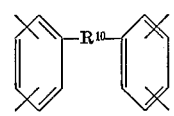

where $R^{10}$ is alkylene of 1-3 carbon atoms, oxygen, sulfur, or one of the following:

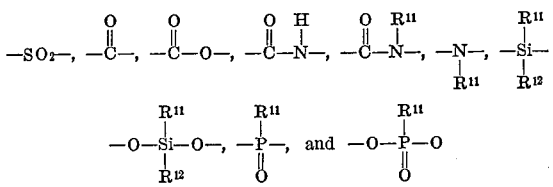

wherein $R^{11}$ and $R^{12}$ are alkyl or aryl, and substituted groups thereof.

The aromatic tetracarboxylic acid units of the polymers can be provided by the corresponding dianhydrides, tetra-acids, diimides, tetraesters or diester diacyl halides. The $R^1$ portion of the polymers are provided by a diamine having the structure of Formula 2 above where each of the indicated unsatisfied valences has an —$NH_2$ group attached thereto.

When the reactants are the diamine and the dianhydride or tetraacid, a useful intermediate polyamide-acid product is obtained. When the reactants are the diamine and the diimide, a useful intermediate polyamide-amide product is obtained. When the reactants are the diamine and the tetraester or diester diacyl halide, a useful intermediate polyamide-ester product is obtained. These intermediate products are readily converted to the corresponding polyimide polymer by heat treatment or chemical treatment, as will be described more fully hereinafter.

As mentioned above, one of the reactants in the preparative methods of this invention is an organic diamine having the structural formula $H_2N$—$R^1$—$NH_2$ where $R^1$ has the structure of Formula 2 above. Representative of such diamines are the following:

4,4'-diamino-2,2',5,5'-tetramethoxy triphenyl methane
4,4'-diamino-2,2',5,5'-tetraethoxy diphenyl p-tolyl methane
3,3'-diamino-4,4'-dimethyl-2,2',5,5'-tetraethoxy triphenyl methane
4,4'-diamino-2,2',5,5'-tetrabutoxy triphenyl methane
1,1-bis(4-amino-2,5-dimethoxyphenyl) phenyl ethane 1,1-bis(4-amino-2,5-diethoxyphenyl) 4-isopropylphenyl methane
4,4'-diamino-2,2',5,5'-tetraethoxy triphenyl methane When one of the reactants is a dianhydride, it will be a tetracarboxylic acid dianhydride having the structural formula (3)

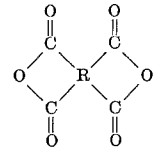

where R is as defined above.

In these dianhydrides every carbonyl group above is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred dianhydrides are the aromatic tetracarboxylic acid dianhydrides, those in which the R groups have at least one ring of 6 carbon atoms characterized by benzenoid unsaturation (alternate double bonds in a ring structure), and particularly those aromatic dianhydrides wherein the 4-carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

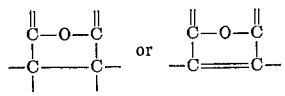

Illustrative of dianhydrides suitable for use in the present invention are the following:

pyromellitic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2'-3,3'-diphenyl tetracarboxylic dianhydride
2,2-bis(3,4-dicarboxyphenyl) propane dianhydride
bis(3,4-dicarboxyphenyl) sulfone dianhydride
3,4,9,10-perylene tetracarboxylic dianhydride
bis(3,4-dicarboxyphenyl) ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride
3,4,3',4'-benzophenone tetracarboxylic dianhydride
2,3,2',3'-benzophenone tetracarboxylic dianhydride
2,3,3',4'-benzophenone tetracarboxylic dianhydride The diamine and dianhydride described above are reacted together to prepare a polyamide-acid having an inherent viscosity of at least 0.1, and preferably 0.3–5, in an organic solvent for at least one of the reactants, the solvent being inert to the reactants, preferably under substantially anhydrous conditions, at a temperature below about 175° C. and for time sufficient to provide in most instances at least 50% by weight of the corresponding polyamide-acid in the form of a shapeable composition. The polyamide-acid can then readily be converted to the polyimide, the polyimide also having an inherent viscosity of at least 0.1 and preferably 0.3–5.

When the reactant with the diamine as described above is a tetraacid, the tetraacid will be an aromatic tetracarboxylic acid of the formula:

(4)

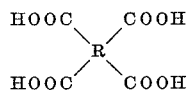

where R is as defined above. Reaction of this tetraacid with the diamine can be carried out substantially according to the techniques and under the conditions just described for reaction of the dianhydride with the diamine, preceded of course by sufficient heating to dehydrate the tetraacid to the dianhydride.

The product of the dianhydride-diamine reaction and the tetraacid-diamine reaction is a polyamide-acid having the following structural formula:

(5)

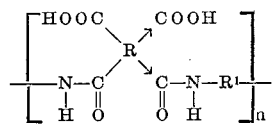

where the arrows denote isomerism, where R and R¹ are as defined above, the amide groups of adjacent polyamide-acid units each attached to separate carbon atoms of the connecting $R^1$ group, and where $n$ is an integer sufficient to provide a polyamide-acid having an inherent viscosity of at least 0.1 and preferably 0.3–5 as measured as an 0.5% by weight solution in N,N-dimethylacetamide at 30° C.

In the selection of a specific time and a specific temperature for forming the polyamide-acid of a specified diamine and a specified dianhydride or tetraacid, several factors will be considered. The maximum temperature will depend on the reactants used, the particular solvent, the percentage of polyamide-acid desired in the final composition and the minimum period of time that one desires for the reaction. For most combinations of reactants, compositions of 100% polyamide-acid can be formed by conducting the reaction below 100° C. However, temperatures up to 175° C. can be used to provide shapeable compositions. The particular temperature below 175° C. that must not be exceeded for any particular combination of reactants, solvent and reaction time to provide a reaction product composed of sufficient polyamide-acid to be shapeable will vary but can be determined by any person of ordinary skill in the art in accordance with the teachings herein. However, to obtain the maximum inherent viscosity, i.e. maximum degree of polymerization, for any particular combination of reactants, solvents, etc., and thus produce shaped articles such as films and filaments of optimum toughness, the temperature throughout the reaction should be maintained below about 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acide, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the other reactant. For forming the composition into shaped articles, it has been found that the most successful results are obtained when the solvent represents at least 60% by weight of the final polymeric solution. That is, the solution should contain 0.05–40% by weight of the polymeric component.

The solvents useful in the solution polymerization process for synthesizing the polyamide-acid compositions are the organic solvents whose functional groups do not react with either of the reactants to any appreciable extent. Besides being inert to the system, and preferably being a solvent for the polyamide-acid, the organic solvent must be a solvent for at least one of the reactants and preferably for both of the reactants. To state it another way, the organic solvent is an organic liquid other than either reactant or homologs of the reactants that is a solvent for at least 1 reactant and contains functional groups, the functional groups being other than monofunctional primary and secondary amino groups and other than the monofunctional dicarboxylanhydro groups.

The normally liquid organic solvents of the N,N-dialkylcarboxylamide class are particularly useful as solvents in the preparation of the polyamide-acids of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with other solvents such as benzene, benzonitrile, dioxane, xylene, toluene and cyclohexane.

When the reactant with the diamine as described above is a diimide, the diimide will have the formula:

(6)

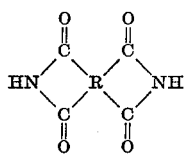

where R has the same meaning as above.

Such diimides can conveniently be prepared by passing gaseous ammonia over any of the tetracarboxylic acid dianhydrides disclosed above at an elevated temperature. The reaction with the diamine can be carried out suitably in an organic solvent for at least one of the reactants, preferably the diimide, the solvent being inert to the reactants, for a time usually on the order of several hours and at a temperature usually on the order of 75°–150° C. sufficient to provide the polyamide-amide of the formula:

(7)

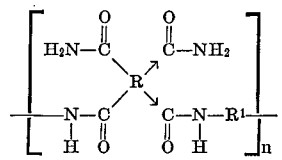

where R, R¹ and n are as defined above and the arrows denote isomerism. The solvents are those disclosed above for the other reactions with the diamine.

When the reactant with the diamine as described above is a tetraester, the tetraester will have the formula:

(8)

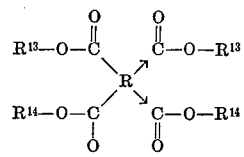

where the arrows denote isomerism, R is as defined above, and $R^{13}$ and $R^{14}$, can be the same or different and each is alkyl or aryl. Usually the pairs of $R^{13}$ and $R^{14}$, when they differ, will differ considerably from each other, such as $R^{13}$ being methyl or ethyl and $R^{14}$ being phenyl or cresyl.

Such tetraesters can conveniently be prepared by first treating suitable dianhydrides such as disclosed above with an alcohol to form the corresponding diester acid and then treating the diester acid with a thionyl halide, a phosphorous halide, a benzal halide, an oxalyl halide or a carbonyl halide, e.g., thionyl chloride, phosphorous pentachloride, phosphorous trichloride, benzotrichloride, phosgene, or the like, to form the corresponding diacyl halide. The diacyl halide can readily be prepared by direct half-esterification of the tetraacid to the diester diacid followed by transformation of the free carboxyl groups to acid chloride groups. In either case, the next step is treatment with sodium alkoxide or an alcohol to form the tetraester. If the same alcohol as used to prepare the diester diacid is used, then the tetraester will have four identical ester groups. If a different alcohol is used, a mixed tetraester is formed.

Another method for preparing the tetraesters involves the reaction of either the tetraacid or the dianhydride with an excess of alcohol or phenol in a suitable solvent such as benzene in the presence of a strong acid catalyst such as sulfuric acid, benzene sulfonic acid, para-toluene sulfonic acid, or the like. The water formed in the reaction is removed continuously by any convenient method such as distillation of the water-benzene azeotrope.

Still another method for preparing the tetraester is by condensation of a salt of the tetraacid with an alkyl halide, e.g., the silver salt of the tetraacid with methyl iodide.

The reaction of the diamine with the tetraester to form the polyamide-ester can be carried out suitably in solution at a temperature usually on the order of 150°–300° C. for a time sufficient to form the polyamide-ester having the formula:

(9)

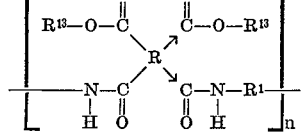

where R, $R^1$, $R^{13}$, $n$ and the arrows have the same meaning as above.

When the reactant with the diamine as described above is a diester diacyl halide, the diester diacyl halide will have the formula:

(10)

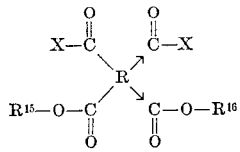

where the arrows denote isomerism, X is halide and $R^{15}$ and $R^{16}$ are alkyl or aryl.

Such diesterdiacyl halides can conveniently be prepared from the corresponding dianhydride by treatment with an alcohol to form the corresponding diester diacid, followed by treatment of the latter with a halide. The reaction with the alcohol ordinarily proceeds at room temperature. Suitable alcohols include aliphatic alcohols of 1–2 carbons such as methanol, ethanol, n-propanol, isopropanol, the butanols, the pentanols, the hexanols, 2-ethylhexanol, isooctyl alcohol and lauryl alcohol; phenol and other aromatic alcohols; aliphatic thiols of 1–12 carbons such as ethanethiol; substituted aliphatic alcohols of 1–12 carbons such as cyanoethanol; etc. Excess alcohol can readily be removed by any convenient method such as distillation, extraction, or the like.

Conversion of the diester diacid to the diester diacyl halide likewise ordinarily proceeds in a solvent at room temperature. Suitable halides include those mentioned above.

The reaction of the diamine with the diester diacyl halide to form the polyamide-ester can be carried out suitably in solution at a temperature usually on the order of 20°–100° C. for a time sufficient to form the polyamide-ester of Formula 9 above.

The novel intermediate polyamide-acids polyamide-amides and polyamide-esters of this invention can be used immediately or stored for subsequent use. They are useful as coating compositions which can be applied to a variety of substrates, for example, metals, e.g. copper, brass, aluminum, steel, etc., the metals in the form of sheets, fibers, wires, screening, etc.; glass in the form of sheets, fibers, foams, fabrics, etc.; polymeric materials, e.g. cellulosic materials such as cellophane, wood, paper, etc., polyolefins such as polyethylene, polypropylene, polystyrene, etc. polyamide, polyesters such as polyethylene terephthalate, etc., perfluorocarbon polymers such as polytetrafluoroethylene, copolymers of tetrafluoroethylene with hexafluoropropylene, etc., polyurethanes, polyimides, all polymeric materials in the form of sheets, fibers, foams, woven and non-woven fabrics, screening, etc.; leather sheets; etc. These coatings can then be converted to polyimide coatings by any convenient method. Such coating compositions can if desired be pigmented with such compounds as titanium dioxide in amounts of about 5–200% by weight.

The novel intermediate products of this invention are preferably used by shaping into a useful article, followed by conversion to the polyimide. It should also be understood that the polymers can be modified with inert materials prior to or subsequent to shaping. These modifying agents may be selected from a variety of types such as pigments, dyes, inorganic and organic fillers, electrically conductive carbon black and metal particles, abrasives, delectrics, lubricating polymers, etc.

Shaping can be accomplished by extrusion through an appropriate orifice or slot to form filaments, rods, flat sheets, tubing, or the like. Alternatively, shaping can be accomplished by casting onto flat or curved surfaces to form sheets, films, etc., or placed in molds of the desired shape.

The novel intermediate products can be converted to the corresponding polyimides by heat treatment or chemical treatment or other suitable means. In the heat treatment, temperatures above about 50° C. will be used for all three intermediate products of this invention, with temperatures above about 125° C. and preferably at least 300° C. for the conversion of the polyamide-amides and polyamide-esters.

A second process particularly useful for conversion of the polyamide-acid involves treating the intermediate with a dehydrating agent alone or in combination with a tertiary amine, e.g. acetic anhydride or an acetic anhydride-pyridine mixture. The intermediate preferably in the form of a shaped article can be treated in a bath containing the acetic anhydride-pyridine mixture. The rate of acetic anhydride to pyridine can vary from just above zero to infinite mixtures.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydride and ketene. Ketenes are regarded as anhydrides of carboxylic acids (ref. Bernthsen-Sudborough, textbook of Organic Chemistry, Van Nostrand 1935, p. 861 and Hackh's Chemical Dictionary, Blakiston 1953, p. 468) derived from drastic dehydration of the acids.

The aromatic monobasic acid anhydrides include the anhydride of benzoic acid and those of the following acids: o-, m- and p-toluic acids m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratic acid, trimethoxy benzoic acid; alpha- and beta-naphthoic acids; and biphenylcarboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine can be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4-6-collidine, and are generally used in larger amounts.

As a third process of conversion, a combination treatment can be used. The intermediate can be partially converted to the polyimide in a chemical conversion treatment and then cyclization to the polyimide completed by subsequent heat treatment. The conversion of the intermediate to the polyimide in the first step can be limited if it is desired to shape the composition at this stage. After shaping, the completion of the cyclization can be accomplished.

Also, as mentioned above, the polyamide-acid in solution can be converted in situ to the polyimide in solution. This final product is readily tractible because it is in solution form and therefore much more convenient and advantageous to use.

Following conversion to the polyimide, if the polyimide is heated to a temperature of 300°–500° C. for a short interval (15 seconds to 2 minutes), improvements in the thermal and hydrolytic stabilities of the polyimide structure are obtained as well as an increase in inherent viscosity.

The solvents useful in the polymerization processes described above are the organic solvents whose functional groups do not react with the reactants to any appreciable extent. Besides being inert to the system and, preferably, being a solvent for the product, the organic solvent must be a solvent for at least one of the reactants, preferably for both of the reactants. Particularly useful are the normally liquid organic solvents of the N,N-dialkycarboxylamide class. The preferred solvents are the lower molecular weight members of this class, particularly N,N-dimethylformamide and N,N-dimethylacetamide. They can easily be removed from the shaped articles by evaporation, displacement or diffusion. Other typical compounds of this useful class of solvents are N,N-diethylformamide, N,N-diethylacetamide, N,N-dimethylmethoxy acetamide, N-methyl caprolactam, etc. Other solvents which can be used are dimethylsulfoxide, N-methyl-2-pyrrolidone, tetramethylene urea, pyridine, dimethylsulfone, hexamethylphosphoramide, tetramethylene sulfone, formamide, N-methylformamide, butyrolactone and N-acetyl-2-pyrrolidone. The solvents can be used alone, in combinations of solvents, or in combination with other solvents such as benzene, benzonitrile, dioxane, xylene, toluene and cyclohexane.

Tenacity as used herein is based upon the cross-sectional area of the film being measured and is determined by elongating a film sample at a rate of 100% per minute or less until the film sample breaks.

Elongation is the percent increase in length at the break of the film in the preceding test.

Modulus is a measure of film stiffness, that is, the higher the modulus the greater the stiffness, and the modulus is the slope of the initial portion of the stress/strain curve at 1% elongation, the film being elongated at a rate of 100% per minute or less.

The invention will be more clearly understood by referring to the examples which follow. These examples, which illustrate specific embodiments of the present invention, should not be construed to limit the invention in any way.

EXAMPLE 1

Equimolar amounts of pyromellitic dianhydride (5.45 grams) and 4,4'-diamino-2,2',5,5'-tetraethoxytriphenyl-methane (11.25 grams) are polymerized in 94.3 grams of N,N-dimethylacetamide by first dissolving the diamine in the solvent at room temperature and then adding the dianhydride in two portions over about 8 minutes. The solution becomes a little warmer and more viscous. It is allowed to stir for about ½ hour longer until it has become much more viscous. Films cast from this solution are light yellow-brown, clear, flexible and tough. Their polyamide-acid structure is confirmed by infrared. Inherent viscosity of the polyamide-acid was 0.94 as measured on an 0.5% by weight solution in N,N-dimethylacetamide at 30° C.

To 27.5 grams of this viscous solution is added 2.0 grams of acetic anhydride and 1.6 gram of pyridine. The solution becomes even more viscous and its color changes to a dark cherry-red. After 45 minutes of stirring a sample of the solution was diluted to 0.5% by weight of polymer. The inherent viscosity of the polymer was measured on this solution and found to be 0.91 at 30° C. After 15 minutes additional stirring, the same amounts of acetic anhydride and pyridine were added. After 30 minutes of additional stirring, samples of the solution are cast into film form and dried in an air-draft oven at about 130° C. for 5 minutes. These dry films are cherry-red in color, clear, flexible and tough. They also are completely soluble in N,N-dimethylacetamide. Their infrared spectra show the complete disappearance of the polyamide-acid bands and the appearance of the characteristic bands for polyimide. The inherent viscosity of these films, at 0.5% by weight solutions in N,N-dimethylacetamide at 30° C., is 1.00. To a portion of the polyimide solution is added ethanol to precipitate the polymer as a powder. This polymer is found to have an inherent viscosity of 0.80 as measured on an 0.5% by weight solution in N,N-dimethylacetamide at 30° C.

Films of this polyimide, cast from the polyimide solution, have the following physical and electrical properties:

Eta (inherent viscosity, 0.5% by weight solutions
  in N,N-dimethylacetamide at 30° C.) _____ 1.00
Modulus—
  At 23° C. _____p.s.i.__ 374,000
  At 200° C. _____p.s.i.__ 157,000
Elongation—
  At 23° C. _____percent__ 5
  At 200° C. _____do__ 24
Tenacity—
  At 23° C. _____p.s.i.__ 11,900
  At 200° C. _____p.s.i.__ 3,500
Density _____gram/cc__ 1.388
Zero strength temperature (° C.) _____ 438±20
Volume resistivity—
  At 23° C. _____ohm-cm__ 3.3×10$^{13}$
  At 200° C. _____do__ 6.0×10$^{12}$
Dissipation factor—
  At 23° C. _____ 0.003–0.005
  At 200° C. _____ 0.002–0.007
Dielectric constant—
  At 23° C. _____ 3.4
  At 200° C. _____ 2.5

EXAMPLES 2–7

Example 1 is repeated except that corresponding molar amounts of the following diamines are substituted for the 4,4'-diamino-2,2',5,5'-tetraethoxy triphenyl methane of that example, with similar satisfactory results.

Example No: Diamine
  2 _____ 4,4'-diamino-2,2',5,5'-tetramethoxy triphenyl methane.
  3 _____ 4,4'-diamino-2,2',5,5'-tetraethoxy diphenyl p-tolyl methane.
  4 _____ 3,3'-diamino - 4,4' - dimethyl-2,2',5,5'-tetraethoxy triphenyl methane.
  5 _____ 4,4'-diamino-2,2',5,5'-tetrabutoxy triphenyl methane.
  6 _____ 1,1-bis(4-amino - 2,5 - dimethoxyphenyl) phenyl ethane.
  7 _____ 1,1-bis(4-amino - 2,5 - diethoxyphenyl) 4-isopropylphenyl methane.

EXAMPLES 8–17

Examples 1 through 7 are repeated except that corresponding molar amounts of the following dianhydrides are substituted for the pyromellitic dianhydride of those examples, with similar satisfactory results.

Example No: Dianhydrides
  8 _____ 2,3,6,7-naphthalene tetracarboxylic dianhydride.
  9 _____ 3,3',4,4'-diphenyl tetracarboxylic dianhydride.
  10 ____ 1,2,5,6-naphthalene tetracarboxylic dianhydride.
  11 ____ 2,2',3,3'-diphenyl tetracarboxylic dianhydride.
  12 ____ 2,2 - bis(3,4-dicarboxyphenyl)propane dianhydride.
  13 ____ Bis(3,4 - dicarboxyphenyl)propane dianhydride.
  14 ____ Bis(3,4 - dicarboxyphenyl)sulfone dianhydride.

15 ____ 3,4,9,10 - perylene tetracarboxylic dianhydride.
16 ____ Bis(3,4-dicarboxyphenyl) ether dianhydride.
17 ____ 3,4,3',4'-benzophenone tetracarboxylic diandride.

EXAMPLE 18

Example 1 is repeated except that for the diamine of that example there is substituted a corresponding molar amount of a 50–50 (on a molar basis) mixture of 4,4'-diamino-2,2',5,5'-tetraethoxy triphenyl methane and 4,4'-diamino-2,2',5,5'-tetramethoxy triphenyl methane, with similar satisfactory results.

EXAMPLE 19

Example 1 is repeated except that for the pyromellitic dianhydride of that example there is substituted a corresponding molar amount of a 50–50 (on a molar basis) mixture of pyromellitic dianhydride and 3,4,3',4'-benzophenone tetracarboxylic dianhydride, with similar satisfactory results.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

The invention claimed is:

1. A polymer consisting essentially of the recurring structural unit

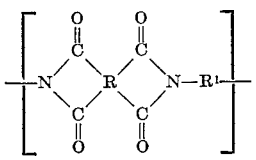

where R is an organic tetravalent radical containing at least two carbon atoms, no more than two carbonyl groups of each such unit being attached to any one carbon atom of said tetravalent radical, and where $R^1$ is a divalent radical of the formula

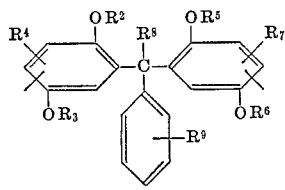

where $R^2$, $R^3$, $R^5$ and $R^6$ each is alkyl of 1 through 4 carbons and $R^4$, $R^7$, $R^8$ and $R^9$ each is selected from the group consisting of hydrogen and alkyl of 1 through 4 carbons.

2. The polymer of claim 1 wherein R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1, 2, 5,6-naphthalene tetracarboxylic dianhydride, 2,2'3,3'-diphenyl tetracarboxylic dianhydride, 2,2-bis(3,4-dicarboxyphenyl)propane dianhydride, bis(3,4 - dicarboxyphenyl)propane dianhydride, bis(3,4-dicarboxyphenyl) sulfone dianhydride, 3,4,9,10-perylene tetracarboxylic dianhydride, bis(3,4 - dicarboxyphenyl)ether dianhydride and 3,4,3',4'-benzophenone tetracarboxylic dianhydride.

3. The polymer of claim 1 wherein $R^1$ is selected from the group consisting of the radicals between the two amino groups in 4,4'-diamino-2,2',5,5'-tetramethoxy triphenyl methane, 4,4'-diamino-2,2',5,5'-tetraethoxy diphenyl p-tolyl methane, 3,3'-diamino-4,4'-dimethyl-2,2',5,5'-tetraethoxy triphenyl methane, 4,4'-diamino-2,2',5,5'-tetrabutoxy triphenyl methane 1,1-bis(4-amino-2,5-dimethoxyphenyl) phenyl ethane, 1,1-bis(4-amino-2,5-diethoxyphenyl) 4-isopropylphenyl methane and 4,4'-diamino-2,2',5,5'-tetraethoxy triphenyl methane.

4. A polyamide-acid consisting essentially of the recurring structural unit

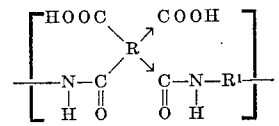

where the arrows denote isomerism; R is an organic tetravalent radical containing at least two carbon atoms, no more than two carbonyl groups in said formula being attached to any one carbon atom of said tetravalent radical; $R^1$ is a divalent radical of the formula

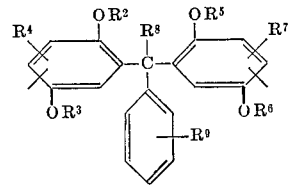

where $R^2$, $R^3$, $R^5$ and $R^6$ each is alkyl of 1 through 4 carbons and $R^4$, $R^7$, $R^8$ and $R^9$ each is selected from the group consisting of hydrogen and alkyl of 1 through 4 carbons; the amide groups of adjacent polyamide-acid units each attached to separate carbon atoms of the connecting $R^1$ group; and said polyamide-acid having an inherent viscosity of at least 0.1 as measured as an 0.5% by weight solution in N,N-dimethylacetamide at 30° C.

5. The polyamide-acid of claim 4 wherein R is selected from the group consisting of aromatic radicals in pyromellitic dianhydride, 2,3,6,7-naphthalene tetracarboxylic dianhydride, 3,3',4,4'-diphenyl tetra-carboxylic dianhydride, 1,2,5,6-naphthalene tetracarboxylic dianhydride, 2,2',3,3'-diphenyl tetracarboxylic dianhydride, 2,2-bis(3, 4-dicarboxyphenyl)propane dianhydride, bis(3,4-dicarboxyphenyl) sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride.

6. The polyamide-acid of claim 4 wherein $R^1$ is selected from the group consisting of the radicals between the two amino groups in 4,4'-diamino-2,2',5,5'-tetramethoxy triphenyl methane, 4,4'-diamino-2,2',5,5'-tetraethoxy diphenyl p-tolyl methane, 3,3'-diamino-4,4'-dimethyl-2,2',5,5'-tetraethoxy triphenyl methane, 4,4'-diamino-2,2',5,5'-tetrabutoxy triphenyl methane, 1,1-bis(4-amino-2,5-dimethoxyphenyl) phenyl ethane, 1,1-bis(4-amino-2,5-diethoxyphenyl) 4-isopropylphenyl methane and 4,4'-diamino-2,2',5,5'-tetraethoxy triphenyl methane.

7. A polyamide-amide consisting essentially of the recurring structural unit

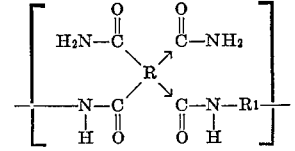

where the arrows denote isomerism; R is an organic tetravalent radical containing at least two carbon atoms, no more than two carbonyl groups in said formula being attached to any one carbon atom of said tetravalent radical; $R^1$ is a divalent radical of the formula

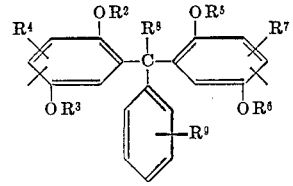

where $R^2$, $R^3$, $R^5$ and $R^6$ each is alkyl of 1 through 4 carbons and $R^4$, $R^7$, $R^8$ and $R^9$ each is selected from the group consisting of hydrogen and alkyl of 1 through 4 carbons; the amide groups of adjacent polyamide-amide units each attached to separate carbon atoms of the connecting $R^1$ group; and said polyamide-amide having an inherent viscosity of at least 0.1 as measured as an 0.5% by weight solution in N,N-dimethylacetamide at 30° C.

8. The polyamide-amide of claim 7 where R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride, bis (3,4-dicarboxyphenyl) sulfone dianhydride, 3,4,9,10-perylene tetracarboxylic dianhydride, bis (3,4-dicarboxyphenyl) ether dianhydride and 3,4,3',4'-benzophenone tetracarboxylic dianhydride.

9. The polyamide-amide of claim 7 where $R^1$ is selected from the group consisting of the radicals between the two amino groups in 4,4'-diamino-2,2'5,5'-tetramethoxy triphenyl methane, 4,4'-diamino-2,2',5,5'-tetraethoxy diphenyl p-tolyl methane, 3,3'-diamino-4,4'-dimethyl-2,2',5,5'-tetraethoxy triphenyl methane, 4,4'-diamino-2,2',5,5'-tetrabutoxy triphenyl methane, 1,1-bis(4-amino-2,5-dimethoxyphenyl) phenyl ethane, 1,1-bis(4-amino-2,5-diethoxyphenyl) 4-isopropylphenyl methane and 4,4'-diamino-2,2',5,5'-tetraethoxy triphenyl methane.

10. A polyamide-ester consisting essentially of the recurring structural unit

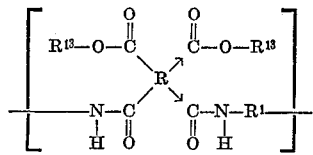

where the arrows denote isomerism; R is an organic tetravalent radical containing at least two carbon atoms, no more than two carbonyl groups in said formula being attached to any one carbon atom of said tetravalent radical; $R^1$ is a divalent radical of the formula

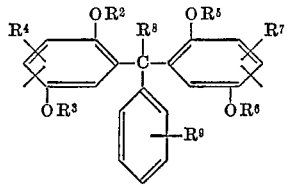

where $R^2$, $R^3$, $R^5$ and $R^6$ each is alkyl of 1 through 4 carbons and $R^4$, $R^7$, $R^8$ and $R^9$ each is selected from the group consisting of hydrogen and alkyl of 1 through 4 carbons; the amide groups of adjacent polyamide-ester units each attached to separate carbon atoms of the connecting $R^1$ group; $R^{13}$ is selected from the group consisting of alkyl and aryl; and said polyamide-ester having an inherent viscosity of at least 0.1 as measured as an 0.5% by weight solution in N,N-dimethylacetamide at 30° C.

11. The polyamide-ester of claim 10 where R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride, bis(3,4-dicarboxyphenyl) sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride.

12. The polyamide-ester of claim 10 where $R^1$ is selected from the group consisting of the radicals between the two amino groups in 4,4' - diamino - 2,2',5,5' - tetramethoxy triphenyl methane, 4,4'-diamino-2,2',5,5'-tetraethoxy diphenyl p-tolyl methane, 3,3'-diamino-4,4'-dimethyl - 2,2',5,5' - tetraethoxy triphenyl methane, 4,4'-diamino-2,2',5,5'-tetrabutoxy triphenyl methane, 1,1-bis(4-amino - 2,5 - dimethoxyphenyl) phenyl ethane, 1,1-bis(4-amino - 2,5 - diethoxyphenyl) 4-isopropylphenyl methane and 4,4'-diamino-2,2',5,5'-tetraethoxy triphenyl methane.

13. A polymer of claim 1 in the form of a self-supporting film.

14. A polymer of claim 1 in the form of a filament.

15. A polyamide-acid of claim 4 in the form of a self-supporting film.

16. A polyamide-acid of claim 4 in the form of a filament.

17. A polyamide-amide of claim 7 in the form of a self-supporting film.

18. A polyamide-amide of claim 7 in the form of a filament.

19. A polyamide-ester of claim 10 in the form of a self-supporting film.

20. A polyamide-ester of claim 10 in the form of a filament.

References Cited

UNITED STATES PATENTS 3,179,630   4/1965   Endrey _____ 260—78
3,312,663   4/1967   Sorenson _____ 260—78

FOREIGN PATENTS 570,858   7/1945   Great Britain.

WILLIAM H. SHORT, Primary Examiner.

H. D. ANDERSON, Assistant Examiner.

U.S. Cl. X.R.

117—138.8, 161; 260—30.2, 30.4, 30.6, 30.8, 32.6, 37, 65, 78; 264—176